United States Patent
Nagashima (10) Patent No.: US 9,471,855 B2
(45) Date of Patent: Oct. 18, 2016

(54) PRINTING APPARATUS, CONTROL METHOD, AND NON-TRANSITORY STORAGE MEDIUM

(71) Applicant: CANON KABUSHIKI KAISHA, Tokyo (JP)

(72) Inventor: Masakazu Nagashima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/994,388

(22) Filed: Jan. 13, 2016

(65) Prior Publication Data

US 2016/0217353 A1 Jul. 28, 2016

(30) Foreign Application Priority Data

Jan. 27, 2015 (JP) ................................. 2015-013530

(51) Int. Cl.
*B41J 11/66* (2006.01)
*H04N 1/00* (2006.01)
*G06K 15/16* (2006.01)

(52) U.S. Cl.
CPC .............. *G06K 15/16* (2013.01); *B41J 11/663* (2013.01); *H04N 1/0032* (2013.01); *H04N 1/00676* (2013.01)

(58) Field of Classification Search
CPC ........ B41J 2/32; B41J 2/2141; B41J 29/393; B41J 2002/14459; B41J 11/663; B41J 11/66; H04N 1/0032; H04N 1/00676
See application file for complete search history.

(56) References Cited

U.S. PATENT DOCUMENTS

| 7,207,639 B2 | 4/2007 | Kachi |
| 7,465,009 B2 | 12/2008 | Fujita |
| 7,808,679 B2 | 10/2010 | Kasuga |
| 7,819,597 B2 * | 10/2010 | Kohira ........................ B41J 2/32 347/171 |
| 8,534,941 B2 | 9/2013 | Takayama |
| 8,659,789 B2 * | 2/2014 | Iwata ..................... G06K 15/16 358/1.1 |
| 8,757,755 B2 | 6/2014 | Hoshi et al. |
| 8,783,859 B2 * | 7/2014 | Tokisawa ............... B41J 11/006 347/104 |
| 8,867,087 B2 | 10/2014 | Takagi |
| 8,950,845 B2 * | 2/2015 | Nagoshi ................ B41J 2/2142 347/14 |
| 2011/0239839 A1 | 10/2011 | Yoshida et al. |
| 2012/0243049 A1 | 9/2012 | Takayama |

FOREIGN PATENT DOCUMENTS

| JP | 2003-112453 A | 4/2003 |
| JP | 3826999 B2 | 9/2006 |
| JP | 2012-196860 A | 10/2012 |
| JP | 2013-159103 A | 8/2013 |

* cited by examiner

*Primary Examiner* — Anh T. N. Vo
(74) *Attorney, Agent, or Firm* — Fitzpatrick, Cella, Harper & Scinto (57) ABSTRACT

A printing apparatus comprising: a conveying unit; a printing unit; a cutting unit; a control unit configured to, in a case in which a marginless image is to be printed, execute a first control of providing a margin portion on a front side of the image and printing the image; and a determination unit, wherein in the case in which a marginless image is to be printed, the control unit suspends execution of the first control until the determination unit determines the image.

13 Claims, 8 Drawing Sheets

PRINTING APPARATUS, CONTROL METHOD, AND NON-TRANSITORY STORAGE MEDIUM

BACKGROUND OF THE INVENTION

1. Field of the Invention

The present invention relates to a printing apparatus, a control method of the printing apparatus, and a non-transitory storage medium.

2. Description of the Related Art

In a printing apparatus such as a printer, a copying machine, or a facsimile apparatus, a printhead prints, for example, an image based on image data onto a printing medium supplied from a feeding unit. As the printing medium, a rolled continuous sheet, a cut sheet, a plastic sheet, or the like is generally used. In particular, a printing apparatus using a continuous sheet, which can handle a printing medium of large size, generally includes a cutting mechanism that cuts the continuous sheet at a predetermined position after printing.

If the continuous sheet cut by the cutting mechanism is extremely short, like a strip, then there may occur end buckling at the start of cutting or jamming of the strip into the apparatus caused by movement of the cutting mechanism, resulting in incomplete cutting. In addition, if the cut continuous sheet is extremely short, the cut continuous sheet may remain in the printing apparatus without being discharged from the apparatus. To prevent such a cutting failure or discharge failure, the printing apparatus sets a minimum cut length that is a minimum length necessary when cutting the continuous sheet by the cutting mechanism. Japanese Patent No. 3826999 discloses a technique of, when cutting continuous sheet by a cutting mechanism, adding a margin to an image to forcibly increase the length of the cut continuous sheet to the minimum cut length if an image to be printed by the printhead is shorter than the minimum cut length.

In recent years, technologies to implement printing without margins on the four sides of a printed product (to be referred to as a "marginless printing" hereinafter) and printing with margins on the four sides of a printed product (to be referred to as a "bordered printing" hereinafter) have been developed. In marginless printing, printing is performed within the range greater than the continuous sheet width in the main scanning direction of the printhead, which is the widthwise direction of the continuous sheet, thereby forming a printed image without margins at the two edges of the continuous sheet in the widthwise direction. Additionally, in marginless printing, image printing is started after the continuous sheet is fed in an extra amount in its conveyance direction. As soon as the image printing start position of the continuous sheet reaches the cutting position of the cutting mechanism, the cutting mechanism cuts the portion fed in the extra amount and part of the image.

This makes it possible to form a printed image without a margin at the leading edge of the continuous sheet. Note that the action of cutting the fed portion and the part of the image for marginless printing will be referred to as a leading edge trimming cut. In the leading edge trimming cut, the continuous sheet including the fed portion and the part of the image is cut. A setting is done such that the total length of the fed portion and the part of the image of the continuous sheet becomes a leading edge trimming cut length. The leading edge trimming cut length is set to be equal to or more than at least the minimum cut length due to the above-described reason.

In marginless printing, image printing is continuously done on the continuous sheet. When the printing ends at the trailing edge of the image in the conveyance direction, the printing edge portion is conveyed to the cutting position. The continuous sheet is cut by the cutting mechanism with part of the image being left on the continuous sheet. The cut continuous sheet thus changes to a cut sheet, and a printed image without a margin on any of the four sides can be formed. The printing apparatus waits until reception of the next printing instruction in a state in which the part of the image is left on the continuous sheet.

Control of a printing apparatus according to related art will be described here with reference to FIG. 8 assuming a case in which an image shorter than a minimum cut length Lc is printed by marginless printing. Note that the positions of broken lines indicate a plurality of cutting positions Ca and Cb at which continuous sheet 1 is cut. An arrow Y in FIG. 8 indicates the conveyance direction Y of the continuous sheet 1. The continuous sheet 1 is conveyed from an upstream side on the upper side of FIG. 8 to the downstream side on the lower side. First, upon receiving a marginless printing instruction for an image 20b of a length Lb shorter than the minimum cut length Lc, the printing apparatus (not shown) adds a leading edge fed portion 33 for leading edge trimming cut to the leading edge of the continuous sheet 1 in the conveyance direction Y. Next, the printing apparatus sets the first cutting position Ca on the upstream side of the leading edge fed portion 33 in the conveyance direction Y. Here, the length from the leading edge of the continuous sheet 1 to the first cutting position Ca becomes at least the minimum cut length Lc.

Since the image 20b after the first cutting position Ca is shorter than the minimum cut length, the printing apparatus adds a leading edge margin 31 and a trailing edge margin 32 to the leading edge and trailing edge of the image 20b in the conveyance direction Y, and sets the second cutting position Cb. The length between the cutting positions Ca and Cb, including the image 20b, the leading edge margin 31, and the trailing edge margin 32, is thus set to at least the minimum cut length Lc.

Figure 8:
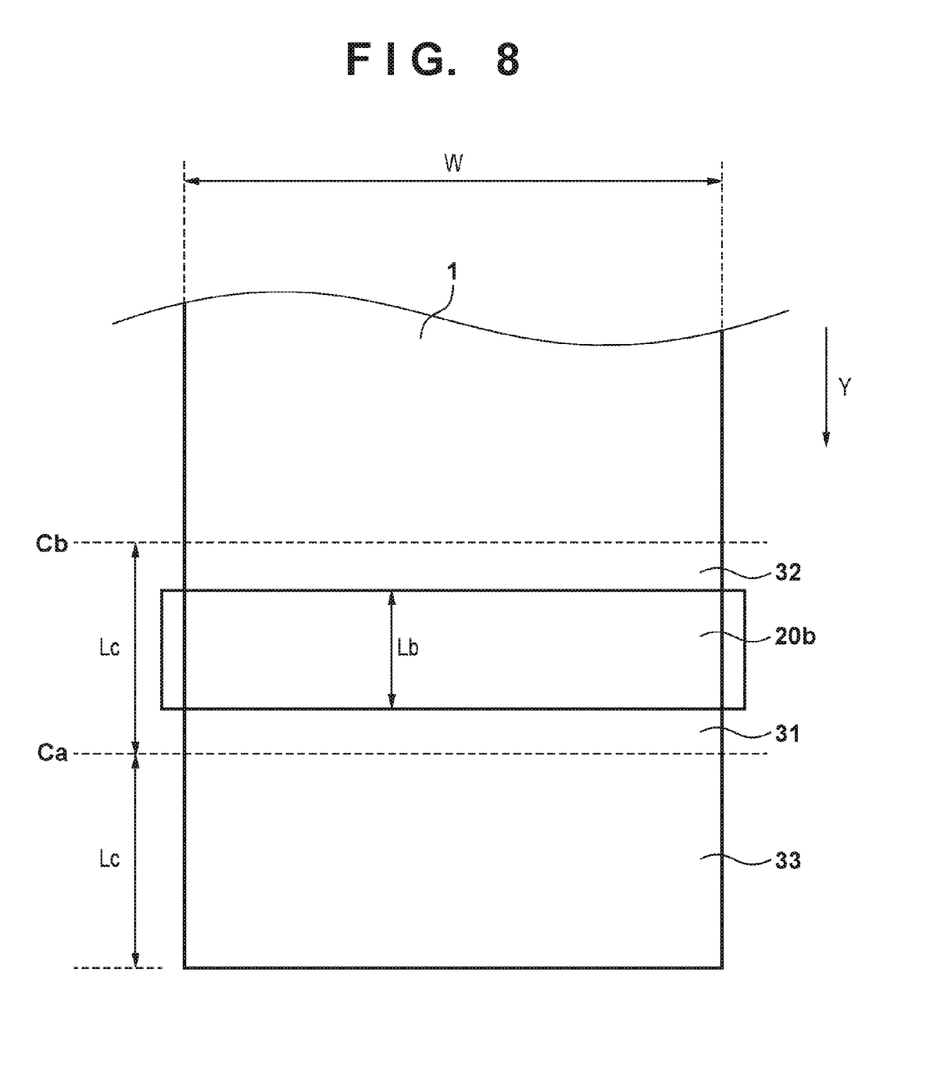
FIG. 8 is an explanatory view showing an example of a print state according to related art.

However, the leading edge fed portion 33 for leading edge trimming cut as in the example of FIG. 8 is unnecessary for the user. Additionally, in the printed product as a cut sheet that is formed by cutting the continuous sheet between the cutting positions Ca and Cb, the leading edge margin 31, the image 20b, and the trailing edge margin 32 are integrally formed in this order from the leading edge in the conveyance direction Y and discharged to the outside of the printing apparatus. The printed product at this stage does not meet the user's requirement of the final form, that is, a form without a margin on any of the four sides of the image 20b. Hence, the leading edge margin 31 and the trailing edge margin 32 need to be cut by post-processing of the user. In addition, the leading edge margin 31 and the trailing edge margin 32 which have been cut off are unnecessary.

Hence, when performing marginless printing in the example of FIG. 8, the printing apparatus operates for the leading edge fed portion 33 for leading edge trimming cut, the leading edge margin 31 of the image 20b, the image 20b, and the trailing edge margin 32 of the image 20b in this order from the leading edge in the conveyance direction Y. That is, the leading edge fed portion 33 for leading edge trimming cut and the leading edge margin 31 of the image 20b to attain the minimum cut length are unnecessary for the user. Plain portions that are unnecessary for the user and are not used for printing are individually continuously generated, wastefully consuming the continuous sheet.

SUMMARY OF THE INVENTION

The present invention provides a technique of reducing wasteful consumption of a continuous sheet.

According to an aspect of the present invention, there is provided a printing apparatus comprising: a conveying unit configured to convey a continuous sheet; a printing unit configured to print an image on the continuous sheet; a cutting unit configured to cut the continuous sheet at a location of a leading edge side and a trailing edge side of the image printed on the continuous sheet; a control unit configured to, in a case in which a marginless image is to be printed, execute a first control of providing a margin portion on a front side of the image and printing the image; and a determination unit configured to determine whether the image is shorter than a predetermined length in a conveyance direction, wherein in the case in which the marginless image is to be printed, the control unit suspends execution of the first control until the determination unit determines the image.

According to still another aspect of the present invention, there is provided a control method of a printing apparatus including: a conveying unit configured to convey a continuous sheet; a printing unit configured to print an image on the continuous sheet; a cutting unit configured to cut the continuous sheet at a location of a leading edge side and a trailing edge side of the image printed on the continuous sheet; a control unit configured to, in a case in which a marginless image is to be printed, execute a first control of providing a margin portion on a front side of the image and printing the image; and a determination unit configured to determine whether the image is shorter than a predetermined length in a conveyance direction, the method comprising: causing the control unit to prepare the first control; and in the case in which the marginless image is to be printed, suspending execution of the first control until the determination unit determines the image.

According to still another aspect of the present invention, there is provided a non-transitory storage medium storing a program for causing a computer of a control method of a printing apparatus including: a conveying unit configured to convey a continuous sheet; a printing unit configured to print an image on the continuous sheet; a cutting unit configured to cut the continuous sheet at a location of a leading edge side and a trailing edge side of the image printed on the continuous sheet; a control unit configured to, in a case in which a marginless image is to be printed, execute a first control of providing a margin portion on a front side of the image and printing the image; and a determination unit configured to determine whether the image is shorter than a predetermined length in a conveyance direction, the program comprising: causing the control unit to prepare the first control; and in the case in which the marginless image is to be printed, suspending execution of the first control until the determination unit determines the image.

Further features of the present invention will become apparent from the following description of exemplary embodiments (with reference to the attached drawings).

DESCRIPTION OF THE EMBODIMENTS

An embodiment of the present invention will now be described in accordance with the accompanying drawings. Note that the same reference numerals denote the same or corresponding parts throughout the drawings. In the following explanation, the upward/downward and leftward/rightward directions of a drawing are used as the upward/downward and leftward/rightward directions of an inkjet printing apparatus 100 or continuous sheet (to be described later) for the description. "Image" broadly includes information formed on a printing medium, for example, information such as characters and graphics, and figures, patterns, and the like including these pieces of information regardless of whether they are significant or insignificant and whether they are so visualized as to be visually perceivable by humans.

"Printing" not only includes the formation of significant information such as characters and graphics, but also broadly includes the formation of images, figures, patterns, and the like on a printing medium, or the processing of the medium, regardless of whether they are significant or insignificant and whether they are so visualized as to be visually perceivable by humans. In this embodiment, "printing medium" is assumed to be a rolled continuous sheet, but it may be paper, cloth, a plastic film, or the like. "Ink" (to be also referred to as a "liquid") should be extensively interpreted similar to the definition of "print" described above. That is, "ink" represents a liquid which, when applied onto a printing medium, can form images, figures, patterns, and the like, can process the printing medium, and can process ink (for example, solidifying or insolubilizing a coloring agent contained in ink applied to the printing medium).

<Inkjet Printing Apparatus 100>

Figure 1:
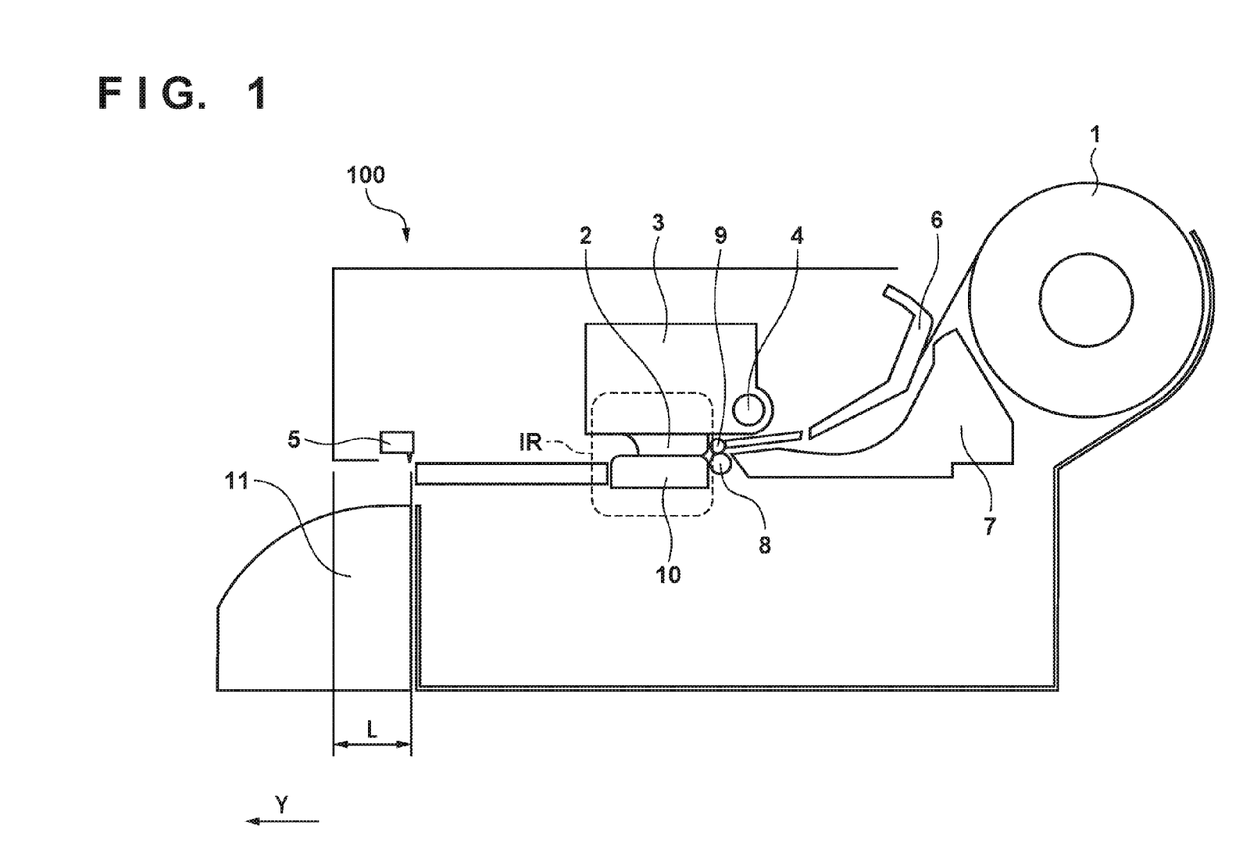
FIG. 1 is a schematic sectional view showing an inkjet printing apparatus according to an embodiment of the present invention.

The schematic arrangement of an inkjet printing apparatus 100 according to the embodiment of the present invention will be described with reference to FIG. 1. FIG. 1 is a schematic sectional view of the inkjet printing apparatus 100. Referring to FIG. 1, the direction indicated by an arrow Y is the conveyance direction Y in which continuous sheet 1 to be described later is conveyed. The right side in FIG. 1 will be referred to as an upstream side, and the left side as a downstream side and used in the following explanation. The inkjet printing apparatus 100 includes the continuous sheet 1, a printhead unit 2, a carriage 3, a carriage shaft 4, a cutter 5 serving as a cutting unit, an upper guide 6, a lower guide 7, a conveyance roller 8, a pinch roller 9, a platen 10, and a discharge guide 11.

The rolled continuous sheet 1 is arranged on the right side of the inkjet printing apparatus 100 in FIG. 1. The continuous sheet 1 held on the inkjet printing apparatus 100 is fed to the downstream side via a continuous sheet conveyance path formed from the upper guide 6 and the lower guide 7. When the leading edge of the continuous sheet 1 reaches the nip portion between the conveyance roller 8 and the pinch roller 9, the continuous sheet 1 is nipped by the conveyance roller 8 and the pinch roller 9, which serve as a conveying unit, and conveyed onto the platen 10 facing the printhead unit 2. The printhead unit 2, the carriage 3 on which the printhead unit 2 is mounted, and the platen 10 facing the printhead unit 2 construct an image printing unit IR. The printhead unit 2 discharges ink to the continuous sheet 1 conveyed to the image printing unit IR to print an image.

The carriage 3 is slidably supported along the carriage shaft 4 and a guide rail (not shown), which are arranged in parallel to each other in the inkjet printing apparatus 100. The moving direction of the carriage 3 is a direction perpendicular to the conveyance direction Y of the continuous sheet 1. This direction will be referred to as a main scanning direction. Note that the conveyance direction Y will be referred to as a sub-scanning direction. In the image printing unit IR, when the carriage 3 moves forward or backward to scan one line, and an image is thus formed on the continuous sheet 1, the conveyance roller 8 and the pinch roller 9 feed the continuous sheet 1 in the conveyance direction Y by a predetermined pitch. After that, the image printing unit IR moves the carriage 3 again to print the image of the next line. The entire image is printed by repeating this operation. A printed portion of the continuous sheet 1 is conveyed to the discharge guide 11. When image printing ends, the continuous sheet 1 is conveyed to a predetermined cutting position at which the cutter 5 is arranged, and cut by the cutter 5 in a direction crossing the conveyance direction Y.

The cut continuous sheet 1 is discharged from the discharge guide 11 to the outside of the inkjet printing apparatus 100. The distance from the cutter 5 as the cutting position of the continuous sheet 1 to the outer periphery of the housing of the inkjet printing apparatus 100 is defined as a distance L. In this case, if the continuous sheet 1 to be cut is considerably shorter than the distance L, the continuous sheet 1 after cutting readily remains at the position, and it is difficult for the user to externally remove the sheet. In addition, when cutting the continuous sheet 1 into a considerably short strip shape, the continuous sheet 1 is easily moved by an external factor such as a cutting operation or next printing operation, and an unexpected operation failure may occur in the inkjet printing apparatus 100. Hence, for example, the distance L is set to a minimum cut length Lc that allows the cut continuous sheet to be discharged or allows the continuous sheet to be cut. If the length of a printed image is shorter than the minimum cut length Lc, a margin (margin portion) needs to be added to make the length longer than the minimum cut length Lc. The minimum cut length Lc can be, for example, 100 to 200 mm. However, the minimum cut length is not limited to this, and may have another value depending on the arrangement of the printing apparatus 100.

<Control Arrangement>

Figure 2:
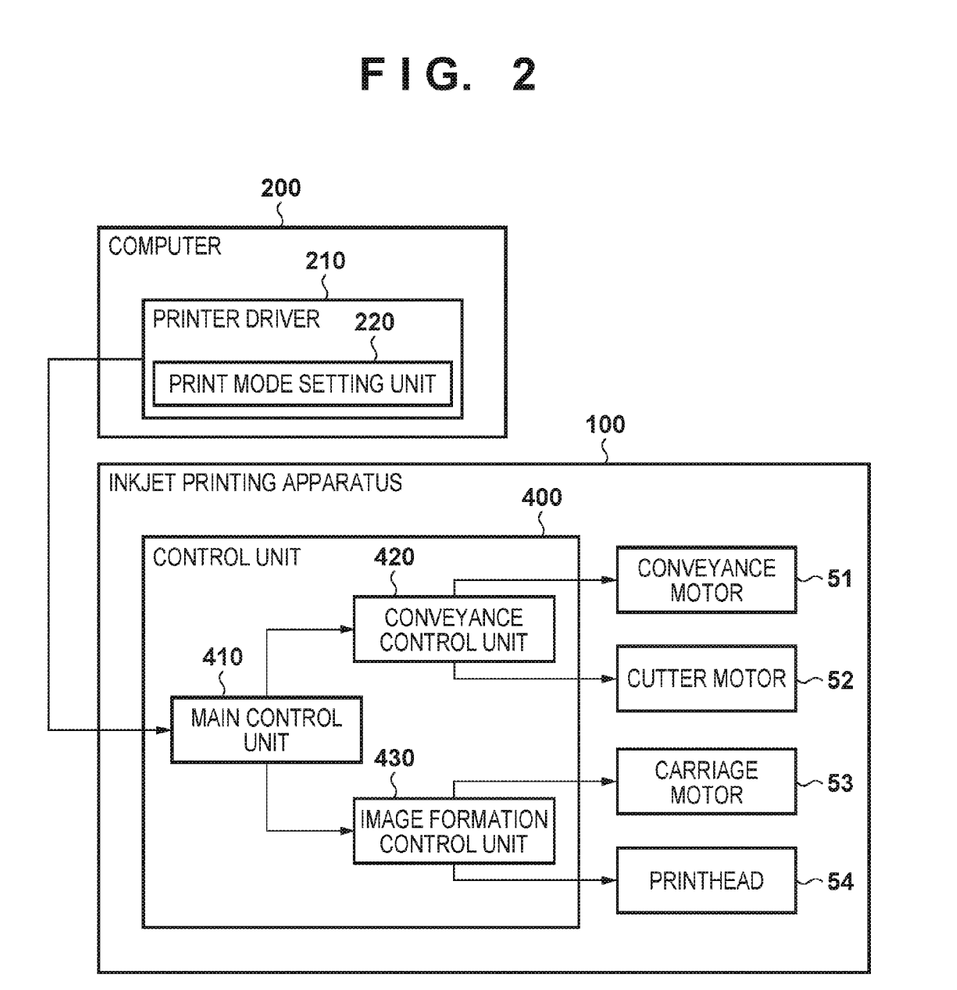
FIG. 2 is a block diagram showing a control arrangement according to the embodiment of the present invention.

A schematic block diagram showing a control arrangement according to the embodiment of the present invention will be described next with reference to FIG. 2. The inkjet printing apparatus 100 is connected to a computer 200 as an external apparatus via an interface (not shown). A printer driver 210 stored in a storage unit is constituted on the computer 200. In this embodiment, at least a print mode setting unit 220 is provided as a function of the printer driver 210. In the print mode setting unit 220, marginless printing and bordered printing can be selected by the user.

A control unit 400 is constituted on the inkjet printing apparatus 100. The control unit 400 controls a conveyance motor 51, a cutter motor 52, a carriage motor 53, and a printhead 54. The control unit 400 includes a main control unit 410, a conveyance control unit 420, and an image formation control unit 430, including a CPU, a ROM, a RAM, and a motor driver (none are shown). The main control unit 410 determines whether an image length received from the printer driver 210 is long or short with respect to the minimum cut length Lc, and gives instructions to the conveyance control unit 420 and the image formation control unit 430. Hence, the main control unit 410 serves as a determination unit that can prepare and execute a plurality of controls (trimming cut control that is first control and minimum cut control that is second control) to be described later and determines application of the controls.

Based on the instruction from the main control unit 410, the conveyance control unit 420 drives the conveyance motor 51 to feed the sheet such that a length equal to or more than the minimum cut length Lc is obtained, and drives the cutter motor 52 to cut the continuous sheet 1. Based on the instruction from the main control unit 410, the image formation control unit 430 cooperatively drives the carriage motor 53 and the printhead 54 to form an image at a predetermined position on the continuous sheet 1. Note that in this embodiment, the main control unit 410 determines whether an image length is long or short with respect to the minimum cut length Lc. However, the determination may be done with respect to a minimum image length stored in the printer driver 210. At this time, the main control unit 410 determines whether an image length is long or short with respect to the minimum image length stored in the printer driver 210.

First Embodiment

Figure 3:
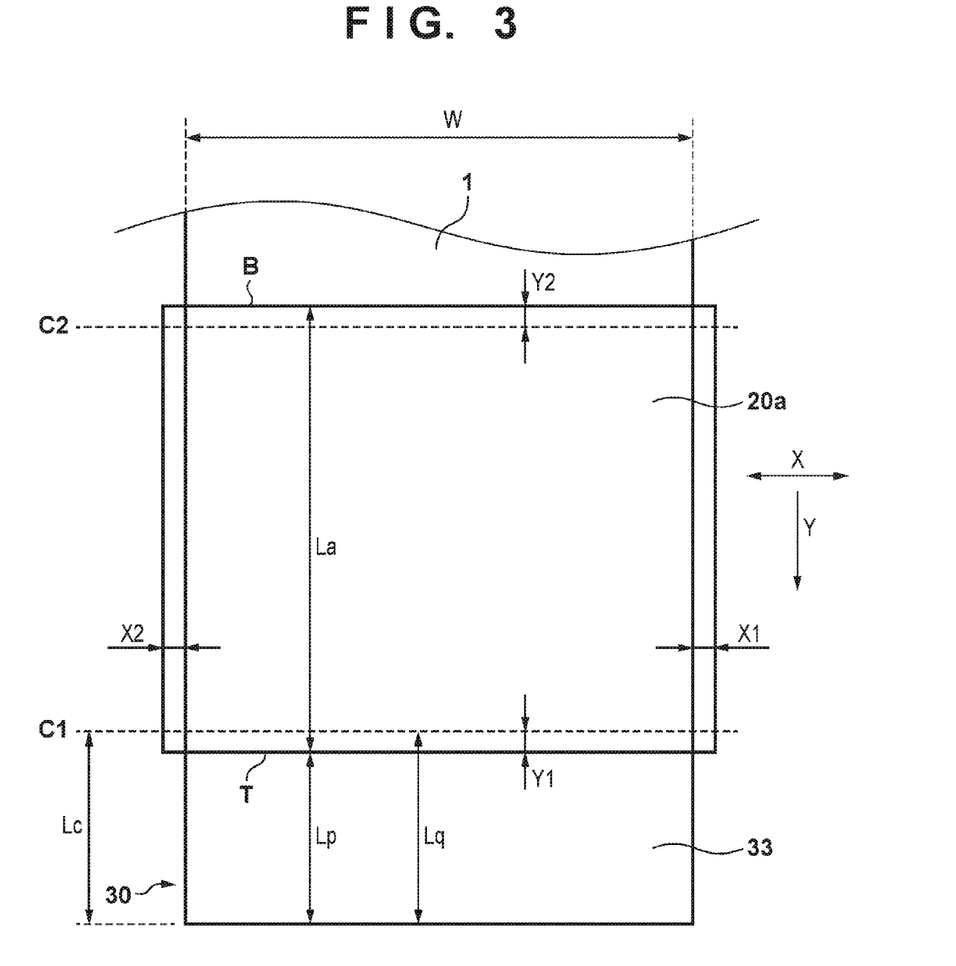
FIG. 3 is an explanatory view showing a print state of marginless printing according to the first embodiment in which an image has a length equal to or more than the minimum cut length.
Figure 4:
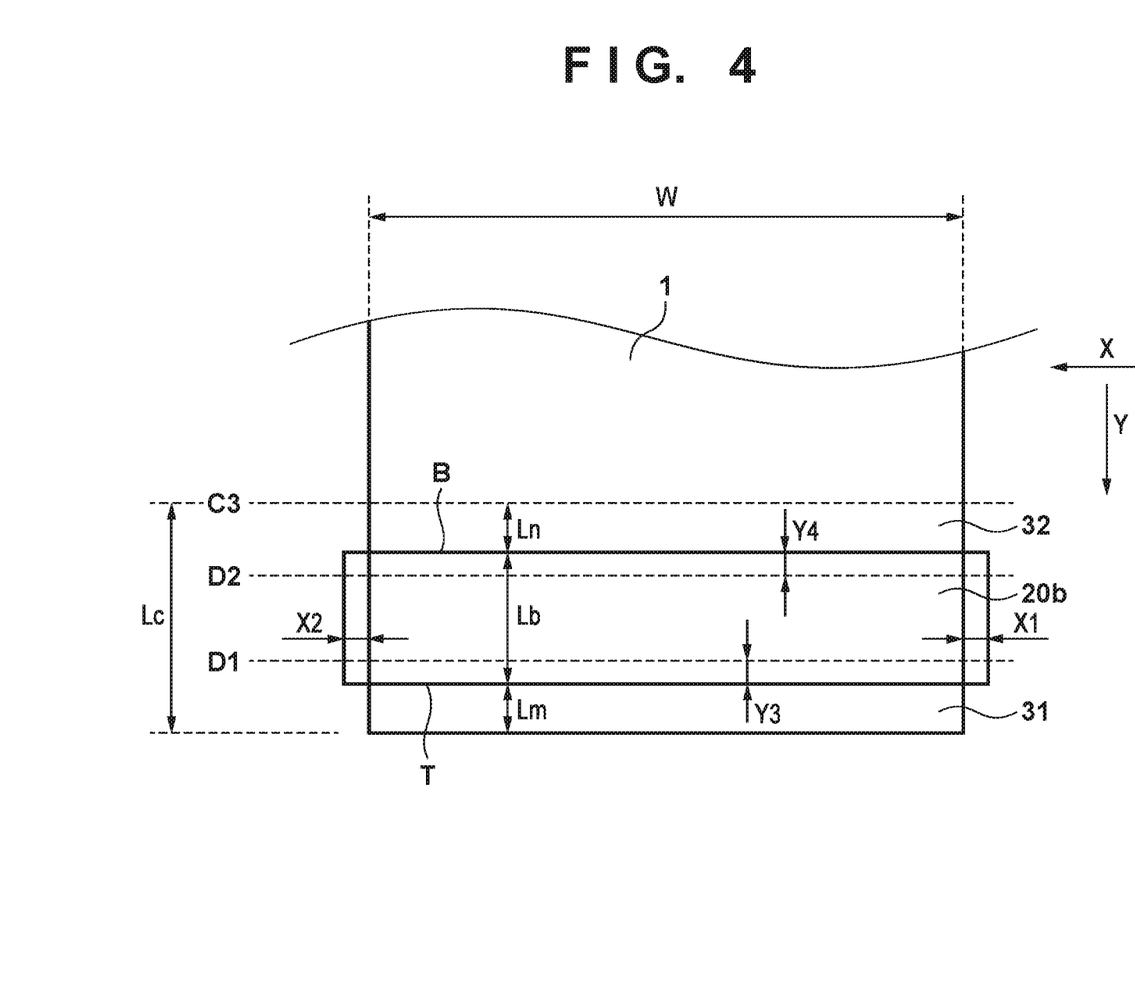
FIG. 4 is an explanatory view showing a print state of marginless printing according to the first embodiment in which an image has a length shorter than the minimum cut length.
Figure 5:
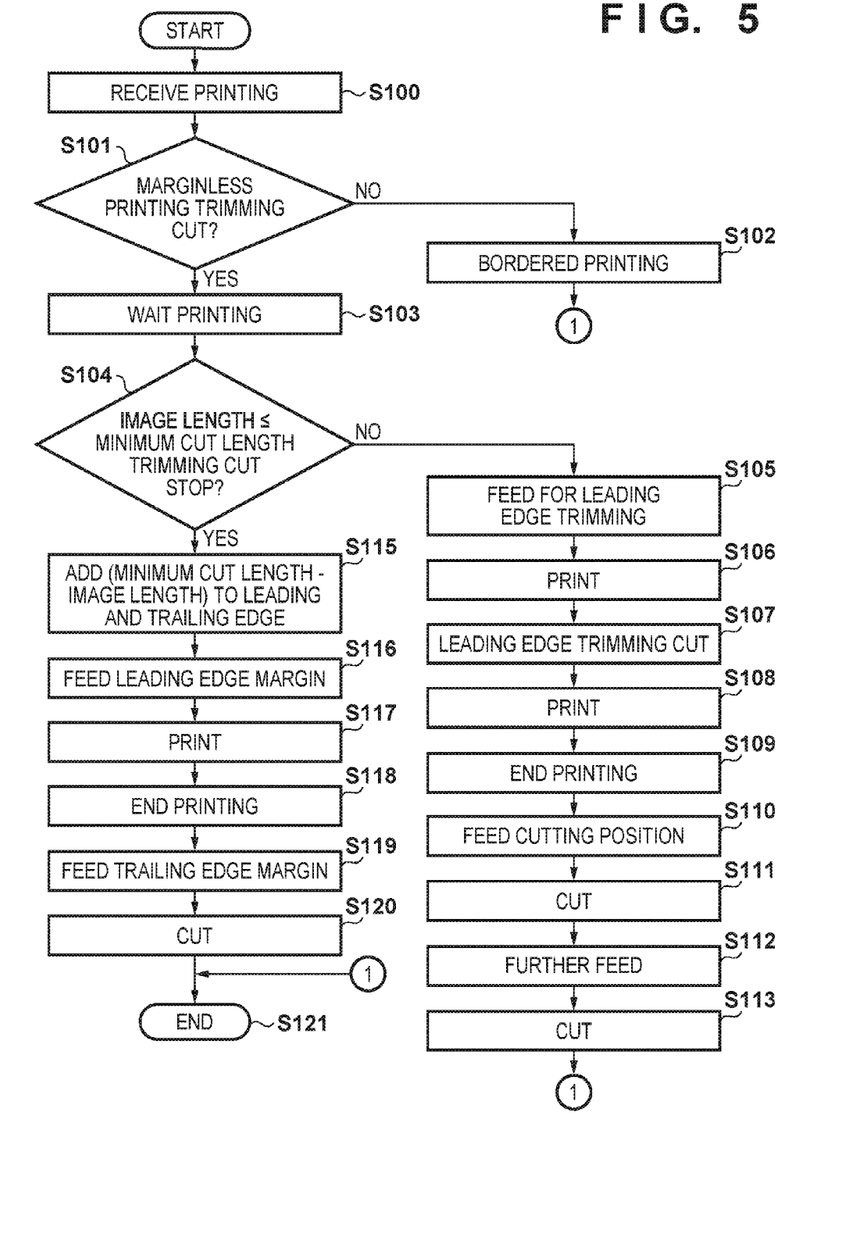
FIG. 5 is a flowchart of the first embodiment.

A print control method according to the first embodiment in an inkjet printing apparatus 100 for continuous sheet 1 will be described next with reference to FIGS. 3 to 5. FIG. 3 is an explanatory view showing a print state of marginless printing in which an image has a length equal to or more than a minimum cut length Lc. FIG. 4 is an explanatory view showing a print state of marginless printing in which an image has a length shorter than the minimum cut length Lc. FIG. 5 is a flowchart of the first embodiment of the present invention. The positions of broken lines in FIGS. 3 and 4 indicate cutting positions.

A case in which marginless printing is executed using an image length equal to or more than the minimum cut length Lc will be described with reference to FIG. 3. In FIG. 3, an arrow X indicates the main scanning direction X of a printhead unit 2, and an arrow Y indicates the conveyance direction Y of the continuous sheet 1. The downstream side (the lower side in FIG. 3) of an image 20a in the conveyance direction Y is defined as an image leading edge T, and an upstream side (the upper side in FIG. 3) is defined as an image trailing edge B.

First, upon receiving a marginless printing instruction for the image 20a from a printer driver 210, the inkjet printing apparatus 100 determines whether an image length La of the image 20a is shorter than the minimum cut length Lc. If it is revealed by the determination that the image length La is equal to or more than the minimum cut length Lc, a leading edge fed portion 33 necessary for the above-described leading edge trimming cut is added to the image leading edge T of the image 20a, and a cutting position C1 for the leading edge trimming cut is set. As the image 20a is printed on the continuous sheet 1 (to be described later), the continuous sheet 1 is cut at the cutting position C1. That is, when executing marginless printing, the inkjet printing apparatus 100 operates the conveying unit to convey the continuous sheet 1 before printing of the image 20a. The inkjet printing apparatus 100 adds the leading edge fed portion 33 serving as a margin to the leading edge (front edge) of the image 20a in the conveyance direction Y and prints the image 20a (trimming cut control that is first control). After that, the continuous sheet 1 including the leading edge fed portion 33 and part of the leading edge of the image 20a is cut.

The length of the leading edge fed portion 33 is defined as a leading edge fed portion length Lp, and the length cut by leading edge trimming cut is defined as a leading edge trimming cut length Lq. Note that the leading edge trimming cut length Lq is the sum of the leading edge fed portion length Lp and a step-in length Y1 from the cutting position C1 of the image leading edge T. Here, Lq=(Lp+Y1)≥Lc holds. That is, the leading edge trimming cut length Lq cut by leading edge trimming cut is also restricted by the above-described minimum cut length Lc. This is because if any one of the lengths cut from the continuous sheet 1 by a cutter 5 is shorter than the minimum cut length Lc, a discharge failure or operation failure occurs. Note that the step-in length Y1 can be about 3 mm.

After the printing operation of the image 20a on the continuous sheet 1, a cutting position C2 at which the cutter 5 cuts the continuous sheet 1 is set at a position corresponding to the image length La. The cutting position C2 is set at a position moved from the image trailing edge B of the image 20a to the downstream side by a distance indicated by a step-in length Y2. When the control operation is determined in this way, the continuous sheet 1 is conveyed by a predetermined amount in the conveyance direction Y, and printing of the image leading edge T of the image 20a starts from a position moved from the cutting position C1 to the downstream side by a distance indicated by the step-in length Y1.

Next, when printing on the continuous sheet 1 in the main scanning direction X, the printhead unit 2 discharges ink up to a position moved rightward from the right edge of the continuous sheet 1 shown in FIG. 3 by a distance indicated by an extra-printing width X1, and discharges ink up to a position moved leftward from the left edge of the continuous sheet 1 shown in FIG. 3 by a distance indicated by an extra-printing width X2. That is, the printhead unit 2 discharges ink within the range more than a width W of the continuous sheet 1 at the time of main scanning, thereby forming an image without margins concerning the right and left edges of the continuous sheet 1 in a direction (widthwise direction) crossing the conveyance direction. Note that the extra-printing widths X1 and X2 can be about 3 mm. A platen 10 of the inkjet printing apparatus 100 may be provided with a structure capable of receiving ink to cope with the ink discharge within the range more than the width of the continuous sheet 1.

When printing of the image 20a progresses, and the cutting position C1 is conveyed to the attachment position of the cutter 5, the continuous sheet 1 is cut at the position. Since the leading edge fed portion 33 added for the leading edge trimming cut is cut while including the step-in length Y1 of the leading edge of the image 20a, a printed image without a margin at the leading edge can be formed on the continuous sheet 1. Printing of the image 20a further progresses, and printing of the image trailing edge B of the image 20a ends at a position moved from the cutting position C2 to the upstream side by a distance indicated by the step-in length Y2.

When printing of the image 20a ends, the cutting position C2 of the continuous sheet 1 is conveyed up to the cutter 5 in the conveyance direction Y. When the cutting position C2 reaches the attachment position of the cutter 5, the continuous sheet 1 is cut at the position. An image without a margin at the trailing edge of the image 20a can thus be formed. Note that the step-in length Y2 can be about 3 mm. The numerical values of Y1, Y2, X1, and X2 are merely examples and are not limited to those described above. With the above-described operation, a printed product without a margin on any of the four sides can be obtained.

A case in which marginless printing is executed using an image length shorter than the minimum cut length Lc will be described next with reference to FIG. 4. The downstream side (the lower side in FIG. 4) of an image 20b in the conveyance direction Y is defined as the image leading edge T, and the upstream side (the upper side in FIG. 4) is defined as an image trailing edge B. As described above, upon receiving a marginless printing instruction for the image 20b from the printer driver 210, the inkjet printing apparatus 100 determines whether an image length Lb of the image 20b is shorter than the minimum cut length Lc. If it is revealed by the determination that the image length Lb of the image 20b is shorter than the minimum cut length Lc, the printing apparatus 100 decides to stop adding a leading edge fed portion necessary for the above-described leading edge trimming cut to the image leading edge T of the image 20b. Instead, the printing apparatus 100 decides to add a leading edge margin 31 to the image leading edge T of the image 20b and add a trailing edge margin 32 to the image trailing edge (tail side) B of the image 20b. That is, the margin to be added to the image 20b is divisionally added to both the leading edge and the trailing edge of the image 20b.

The length of the leading edge margin 31 added to the image leading edge T of the image 20b is defined as a leading edge margin length Lm, and the length of the trailing edge margin 32 added to the image trailing edge B is defined as a trailing edge margin length Ln. Note that the leading edge margin 31 and the trailing edge margin 32 added here are cut by the user after the sheet is discharged to the outside of the printing apparatus 100 after the end of printing. In addition, a cutting position C3 at which the cutter 5 cuts the continuous sheet 1 after the printing operation is set at a position moved from the leading edge of the continuous sheet 1 to the upstream side by (Lm+Lb+Ln). As the image 20b is printed on the continuous sheet 1 (to be described later), the continuous sheet 1 is cut at the cutting position C3. That is, when the image 20b has a length shorter than the minimum cut length Lc that is a predetermined image length in the conveyance direction Y, the inkjet printing apparatus 100 drives the conveying unit to convey the continuous sheet 1 before printing of the image 20b. After adding the leading edge margin 31 to at least the leading edge of the image 20b in the conveyance direction Y, the inkjet printing apparatus 100 cuts the continuous sheet 1 on the trailing edge side of the image 20b (minimum cut control that is second control). Note that the total length of the image 20b, the leading edge margin 31, and the trailing edge margin 32 is set to be equal to or more than at least the minimum cut length Lc, as described above. That is, (Lm+Lb+Ln)≥Lc holds.

When the control operation is determined in this way, the continuous sheet 1 is conveyed by a predetermined amount in the conveyance direction Y, and printing of the image leading edge T of the image 20b starts from the position to which the leading edge margin 31 is added. Next, when printing on the continuous sheet 1 in the main scanning direction X, the printhead unit 2 discharges ink up to a position moved rightward from the right edge of the continuous sheet 1 shown in FIG. 4 by a distance indicated by the extra-printing width X1, and discharges ink up to a position moved leftward from the left edge of the continuous sheet 1 shown in FIG. 4 by a distance indicated by the extra-printing width X2. That is, the printhead unit 2 discharges ink within the range more than the width W of the continuous sheet 1 at the time of main scanning, thereby forming an image without margins concerning the right and left edges of the continuous sheet 1 in the widthwise direction. When printing of the image 20b ends, the continuous sheet 1 is conveyed in the conveyance direction Y to make the cutting position C3 reach the attachment position of the cutter 5, and the continuous sheet 1 is cut at the position.

A resultant printed product includes the leading edge margin 31 and the trailing edge margin 32 in the image 20b, has the length (Lm+Lb+Ln), and meets (Lm+Lb+Ln)≥Lc. After that, to obtain a printed product without a margin on any of the four sides, the leading edge margin 31 including part of the image is cut by user processing at a cutting position D1 arranged at a position moved from the image leading edge T of the image 20b to the image side by a distance indicated by a step-in length Y3. The distance from the image leading edge T to the cutting position D1 is defined as the step-in length Y3. In addition, the trailing edge margin 32 including part of the image is cut by user processing at a cutting position D2 arranged at a position moved from the image trailing edge B of the image 20b to the image side by a distance indicated by a step-in length Y4. The distance from the image trailing edge B to the cutting position D2 is defined as the step-in length Y4. The step-in lengths Y3 and Y4 can be about 3 mm but may arbitrarily be set by the user within the range in which no margin is left on the final product. In addition, since part of the image is not left on the continuous sheet 1 in the printing operation up to this time, processing as a preparation to the next printing is unnecessary. With the above-described operation, a printed product without a margin on any of the four sides can be obtained in the case of the image shorter than the minimum cut length. Note that the numerical values of Y3 and Y4 are merely examples, and may be another value depending on the arrangement of the printing apparatus.

The process from print data reception to printed product discharge according to the first embodiment will be described next with reference to the flowchart of FIG. 5. In step S100, the inkjet printing apparatus 100 receives a printing instruction in which marginless printing or bordered printing is set by the printer driver 210. In step S101, a main control unit 410 determines the presence/absence of necessity of trimming cut in accordance with the marginless printing or bordered printing setting. That is, the main control unit 410 determines whether to perform trimming cut control of adding a margin to the leading edge of the image and cutting the continuous sheet 1 including the margin and a portion including the leading edge of the image when executing marginless printing. Note that this determination may be done by a print mode setting unit 220 in the printer driver 210. Upon determining in step S101 that bordered printing is set, and leading edge trimming cut is unnecessary, in step S102, a conveyance control unit 420 and an image formation control unit 430 start an appropriate printing operation of bordered printing based on an instruction from the main control unit 410. After completion of the printing operation, the inkjet printing apparatus 100 ends the printing operation in step S121.

Upon determining in step S101 that marginless printing is set, and leading edge trimming cut is necessary, in step S103, the main control unit 410 suspends printing until it determines whether the image is shorter than the minimum cut length Lc. In step S104, the main control unit 410 compares the image length with the minimum cut length Lc, and determines whether leading edge trimming cut is necessary or not. If the image length is equal to or more than the minimum cut length Lc in step S104, leading edge trimming cut is necessary. Hence, in step S105, the conveyance control unit 420 feeds the continuous sheet by a length necessary for leading edge trimming cut. In step S106, when the leading edge trimming cut length is ensured, the image formation control unit 430 starts printing from a predetermined position. In step S107, when the leading edge trimming cut position (for example, the cutting position C1) reaches the cutter position during printing, the conveyance control unit 420 and the image formation control unit 430 temporarily stop printing and perform leading edge trimming cut, thereby forming an image without a margin at the leading edge.

In step S108, the conveyance control unit 420 and the image formation control unit 430 continue the printing. In step S109, the conveyance control unit 420 and the image formation control unit 430 end the printing at a predetermined position. In step S110, the image formation control unit 430 feeds the image trailing edge cutting position (for example, the cutting position C2) of the continuous sheet 1 that has ended the printing up to the cutter position. In step S111, the conveyance control unit 420 cuts the continuous sheet 1 while leaving a partial image on the continuous sheet 1, thereby forming an image without a margin at the trailing edge. Next, to prepare for the next printing on the continuous sheet 1, the partially left image is processed. In step S112, the conveyance control unit 420 feeds the image left on the continuous sheet 1 ahead of the cutter position. In step S113, the conveyance control unit 420 cuts the fed continuous sheet 1 together with the partially left image. After completion of the above-described operation, the inkjet printing apparatus 100 ends the printing operation in step S121.

If the image length is shorter than the minimum cut length Lc in step S104, leading edge trimming cut is unnecessary. Hence, in step S115, the main control unit 410 decides to subtract the image length from the minimum cut length Lc and add a length obtained by dividing the difference to each of the leading edge and the trailing edge. In step S116, the conveyance control unit 420 feeds the continuous sheet 1 to add the leading edge margin. When the leading edge margin is added, in step S117, the conveyance control unit 420 and the image formation control unit 430 start printing from a predetermined position based on an instruction from the main control unit 410. In step S118, the conveyance control unit 420 and the image formation control unit 430 end the printing at a predetermined position. In step S119, the conveyance control unit 420 feeds the image cutting position (for example, the cutting position C3) of the continuous sheet 1 that has ended the printing up to the cutter position. In step S120, the conveyance control unit 420 cuts the continuous sheet 1 in a state in which the margins are added to the leading edge and the trailing edge. Since next printing on the continuous sheet 1 is already possible, in step S121, the conveyance control unit 420 and the image formation control unit 430 end the series of printing operations based on an instruction from the main control unit 410.

As described above, according to this embodiment, when performing marginless printing, a margin added to each of the leading edge and the trailing edge such that the printed product attains the minimum cut length Lc can serve as a leading edge fed portion to be discarded by leading edge trimming cut. That is, discard of the leading edge trimming cut length based on the minimum cut length of 100 to 200 mm is obviated. It is therefore possible to correctly discharge the cut continuous sheet and reduce wasteful use amount of the continuous sheet.

Second Embodiment

Figure 6:
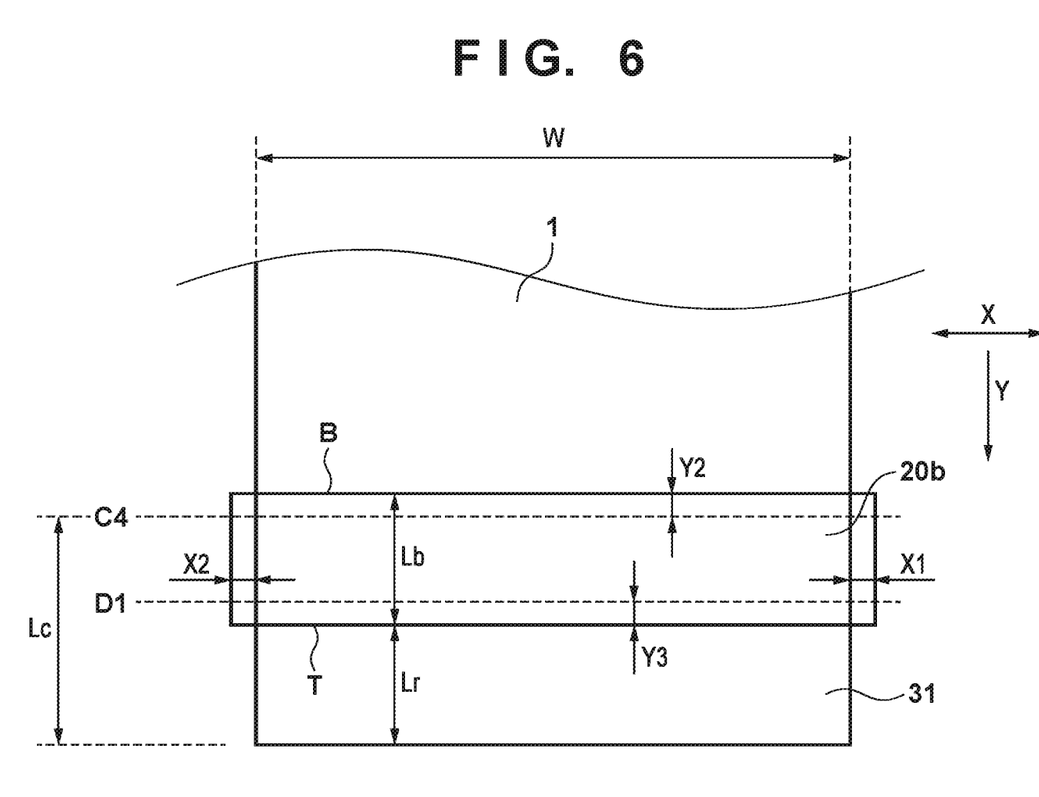
FIG. 6 is an explanatory view showing a print state according to the second embodiment.

The second embodiment, in which a margin to be added to a marginless image shorter than the minimum cut length is added only to the leading edge of the image, will be described next with reference to FIG. 6. Note that the same reference numerals as in the first embodiment denote the same constituent elements, and a description thereof will be omitted.

First, upon receiving a marginless printing instruction for an image 20b from a printer driver 210, an inkjet printing apparatus 100 determines whether an image length Lb of the image 20b is shorter than a minimum cut length Lc. If it is revealed by the determination that the image length Lb of the image 20b is shorter than the minimum cut length Lc, the printing apparatus 100 stops adding the leading edge fed portion and instead decides to add a leading edge margin 31 to an image leading edge T of the image 20b. The printing apparatus 100 also sets a cutting position C4 to cut the leading edge margin 31 and part of the image 20b from continuous sheet 1. When the length of the image 20b is defined as the image length Lb, the length of the leading edge margin 31 added to the image leading edge T is defined as a leading edge margin length Lr, and the distance from an image trailing edge B is defined as a step-in length Y2, the cutting position C4 is set at a position moved from the leading edge of the continuous sheet 1 by (Lb+Lr−Y2). Here, (Lb+Lr−Y2)≥Lc holds. This is because if any one of the lengths cut from the continuous sheet 1 by a cutter 5 is shorter than the minimum cut length Lc, a discharge failure or operation failure occurs, as described above. Note that the leading edge margin 31 added here is cut by the user after the end of printing, as described above.

When the control operation is determined in this way, the printing apparatus 100 conveys the continuous sheet 1 by a predetermined amount in a conveyance direction Y, and starts printing of the image leading edge T of the image 20b from the position to which the leading edge margin 31 is added. When printing on the continuous sheet 1 in a main scanning direction X, a printhead unit 2 discharges ink up to a position moved rightward from the right edge of the continuous sheet 1 by a distance indicated by an extra-printing width X1, and discharges ink up to a position moved leftward from the left edge of the continuous sheet 1 by a distance indicated by an extra-printing width X2. That is, the printhead unit 2 discharges ink within the range more than a width W of the continuous sheet 1 at the time of main scanning, thereby forming an image without margins concerning the right and left edges of the continuous sheet 1 in the widthwise direction. When printing of the image 20b ends, the printing apparatus 100 conveys a cutting position C4 of the continuous sheet 1 up to the attachment position of the cutter 5 in the conveyance direction Y. When the cutting position C4 reaches the attachment position of the cutter 5, the continuous sheet 1 is cut at the position. Since the trailing edge of the image 20b is cut inside the image 20b at a position moved inward by a distance indicated by the step-in length Y2, an image without a margin at the trailing edge can be formed.

A resultant printed product includes the leading edge margin 31 in the image 20b, and has a length (Lb+Lr−Y2). When obtaining a printed product without a margin on any of the four sides, the leading edge margin 31 including part of the image is cut by the above-described user processing at a cutting position D1 arranged at a position moved from the image leading edge T of the image 20b to the image side. The distance from the image leading edge T to the cutting position D1 is defined as a step-in length Y3. The value of the step-in length Y3 can arbitrarily be set by the user within the range in which no margin is left on the final product.

In this case, to prepare for the next printing, the printing apparatus 100 processes the portion of the step-in length Y2 that is part of the image 20b left on the continuous sheet 1. First, the printing apparatus 100 feeds the portion of the step-in length Y2 ahead of the cutter 5, and cuts the continuous sheet by the cutter 5 at a predetermined position together with the fed portion of the continuous sheet 1. That is, the portion cut at this time is formed from the portion of the step-in length Y2 left on the continuous sheet 1 and the fed portion of the continuous sheet 1. The length of the portion is set to at least the minimum cut length Lc or more.

Figure 7:
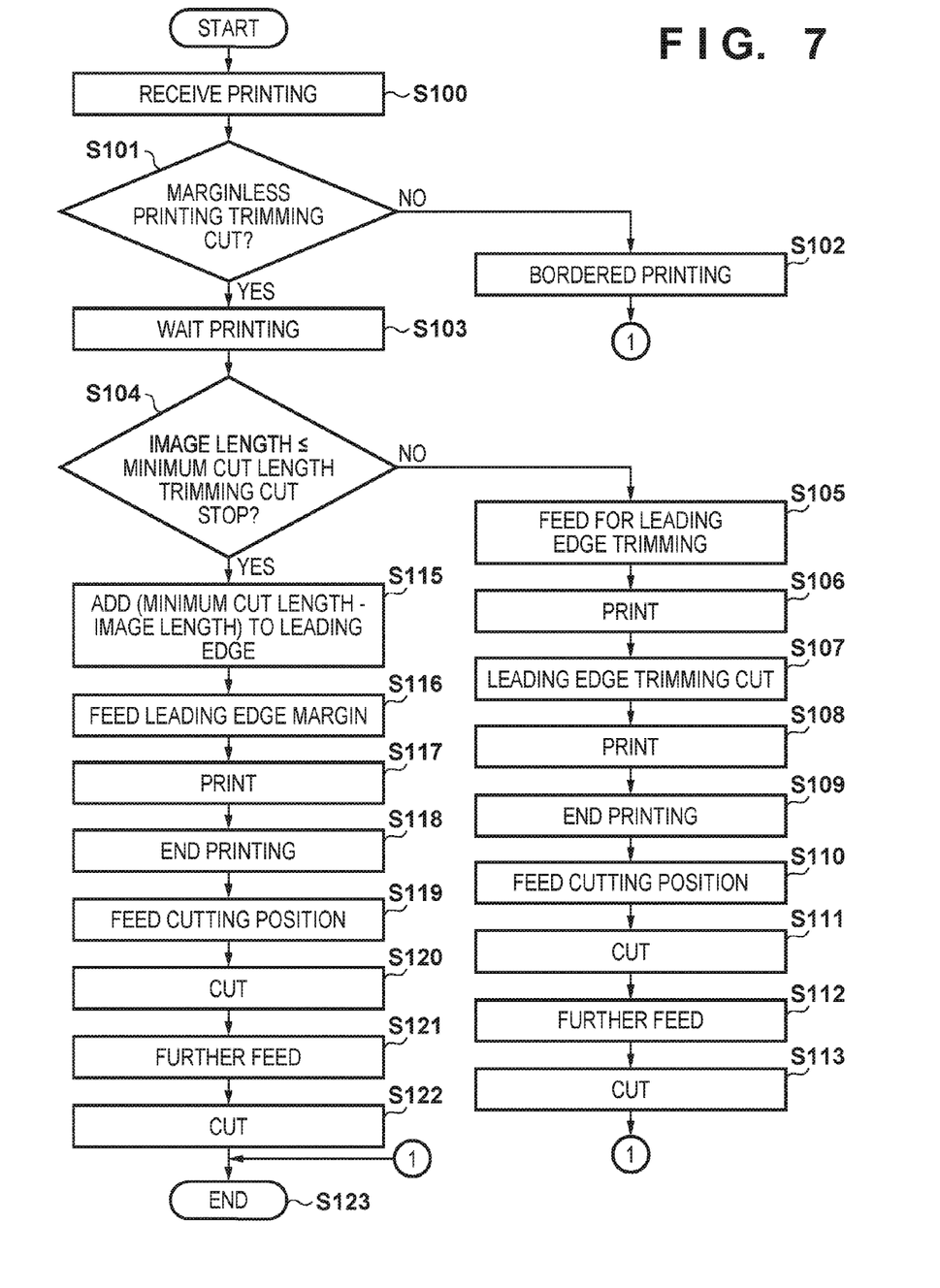
FIG. 7 is a flowchart of the second embodiment.

The process from print data reception to printed product discharge according to the second embodiment will be described next with reference to the flowchart of FIG. 7. In step S100, the inkjet printing apparatus 100 receives a printing instruction in which marginless printing or bordered printing is set by the printer driver 210. In step S101, a main control unit 410 determines the presence/absence of necessity of trimming cut in accordance with the marginless printing or bordered printing setting. That is, the main control unit 410 determines whether to perform trimming cut control of adding a margin to the leading edge of the image and cutting the continuous sheet 1 including the margin and a portion including the leading edge of the image when executing marginless printing. Note that this determination may be done by a print mode setting unit 220 in the printer driver 210.

Upon determining in step S101 that bordered printing is set, and leading edge trimming cut is unnecessary, in step S102, a conveyance control unit 420 and an image formation control unit 430 start an appropriate printing operation of bordered printing based on an instruction from the main control unit 410. After completion of the printing operation, the inkjet printing apparatus 100 ends the printing operation in step S123. Upon determining in step S101 that marginless printing is set, and leading edge trimming cut is necessary, in this embodiment, the main control unit 410 suspends printing in step S103 until it determines whether the image is shorter than the minimum cut length Lc. In step S104, the main control unit 410 compares the image length with the minimum cut length Lc, and determines whether to continue or stop leading edge trimming cut control.

Upon determining in step S104 that the image length is equal to or more than the minimum cut length Lc, and leading edge trimming cut is necessary, in step S105, the conveyance control unit 420 feeds the continuous sheet 1 by a length necessary for leading edge trimming cut. In step S106, when the leading edge trimming cut length is ensured, the conveyance control unit 420 and the image formation control unit 430 start printing from a predetermined position based on an instruction from the main control unit 410. In step S107, when the leading edge trimming cut position reaches the cutter position during printing, the conveyance control unit 420 temporarily stops printing and performs leading edge trimming cut, thereby forming an image without a margin at the leading edge. In step S108, the conveyance control unit 420 and the image formation control unit 430 continue the printing. In step S109, the conveyance control unit 420 and the image formation control unit 430 end the printing at a predetermined position. In step S110, the conveyance control unit 420 feeds the image trailing edge cutting position of the continuous sheet 1 that has undergone the printing up to the cutter position. In step S111, the conveyance control unit 420 cuts the continuous sheet 1 while leaving a partial image on the continuous sheet 1, thereby forming an image without a margin at the trailing edge. To process the partially left image to prepare for the next printing, in step S112, the main control unit 410 feeds the image left on the continuous sheet 1 ahead of the cutter position. In step S113, the conveyance control unit 420 cuts the fed continuous sheet 1 together with the partially left image. After completion of the above-described operation, the inkjet printing apparatus 100 ends the printing operation in step S123.

If the image length is shorter than the minimum cut length Lc in step S104, it is determined to stop leading edge trimming cut control. In step S115, the main control unit 410 decides to add a margin of a length obtained by subtracting the image length from the minimum cut length Lc to the leading edge of the image. In step S116, the conveyance control unit 420 feeds the continuous sheet 1 based on an instruction from the main control unit 410 to add the leading edge margin to the image. When the leading edge margin is added, in step S117, the conveyance control unit 420 and the image formation control unit 430 start printing from a predetermined position. In step S118, the conveyance control unit 420 and the image formation control unit 430 end the printing at a predetermined position. In step S119, the conveyance control unit 420 feeds the cutting position (for example, the cutting position C4) of the continuous sheet 1 that has undergone the printing up to the cutter position. In step S120, the conveyance control unit 420 cuts the continuous sheet 1. To process the partially left image to prepare for the next printing on the continuous sheet 1, in step S121, the conveyance control unit 420 feeds the image left on the continuous sheet 1 ahead of the cutter position. In step S122, the conveyance control unit 420 cuts the fed continuous sheet 1 together with the partially left image. In step S123, the conveyance control unit 420 and the image formation control unit 430 end the series of printing operations based on an instruction from the main control unit 410.

As described above, according to this embodiment, when performing marginless printing, a margin added to the leading edge such that the printed product attains the minimum cut length Lc can serve as a leading edge fed portion to be discarded by leading edge trimming cut. That is, discard of the leading edge trimming cut length based on the minimum cut length of 100 to 200 mm is obviated.

In the second embodiment, a margin is added only to the leading edge of an image so as to attain the minimum cut length Lc. In the first embodiment, however, margins are added to both the leading edge and the trailing edge of an image. That is, in the first embodiment, when obtaining a printed product without a margin on any of the four sides, the user temporarily obtains a printed product already without a margin on any of the two, left and right edges. As for the two, leading and trailing edges, processing of cutting the margins by the user himself/herself is necessary. In addition, the processing is unnecessary because the image is not partially left on the continuous sheet 1.

On the other hand, in the second embodiment, the user temporarily obtains a printed product already without a margin on any of the three, left and right edges and the trailing edge. Processing of cutting the margin by the user himself/herself is necessary only for the leading edge. Additionally, in this case, the processing is necessary because the image is partially left on the continuous sheet 1. However, this processing can be omitted depending on the mode of subsequent printing. For example, when performing marginless printing next, part of the image is added to the leading edge fed portion for leading edge trimming cut. This can reduce wasteful consumption of the continuous sheet 1.

In the first and second embodiments, according to a required priority order, for example, the user selects whether to give priority to the number of steps of post-processing by the user or waste reduction of the fed portion needed in processing of the image left on the continuous sheet 1. At any rate, in the second embodiment as well, it is therefore possible to correctly discharge the cut continuous sheet 1 and reduce wasteful use amount of the continuous sheet 1. In this embodiment, an inkjet printing apparatus has been exemplified. However, a printing apparatus constituted not by the inkjet method but by the electrophotographic method or electrostatic printing method is also usable. In this embodiment, an inkjet printing apparatus has been exemplified. However, a conveying apparatus including not a printing unit but a conveying unit, a cutting unit, and a determination unit is also usable.

When executing marginless printing, the printing unit forms an image without a margin at the edges of the continuous sheet 1 in the direction crossing the conveyance direction, thereby obtaining a printed product without a margin on any of the four sides in combination with user processing to be performed later. When the predetermined image length used to determine application of minimum cut control is set to a length with which the cutter 5 can cut the continuous sheet 1 or the cut continuous sheet can be discharged to the outside of the printing apparatus, jamming of the continuous sheet into the apparatus or incomplete cutting can be prevented. Additionally, when the predetermined image length used to determine application of minimum cut control is set to the minimum image length stored in the storage unit of the computer 200, a minimum cut length according to, for example, the printer driver can be set. Furthermore, when a margin to be added to the image in minimum cut control (second control) is divisionally added to both the leading edge and the trailing edge of the image, the margins can be arranged in balance on the cut continuous sheet.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-013530, filed Jan. 27, 2015, which is hereby incorporated by reference herein in its entirety.

What is claimed is:

1. A printing apparatus comprising:
a conveying unit configured to convey a continuous sheet;
a printing unit configured to print an image on the continuous sheet;
a cutting unit configured to cut the continuous sheet at a location of a leading edge side and a trailing edge side of the image printed on the continuous sheet;
a control unit configured to, in a case in which a marginless image is to be printed, execute a first control of providing a margin portion on a front side of the image and printing the image; and
a determination unit configured to determine whether the image is shorter than a predetermined length in a conveyance direction,
wherein in the case in which the marginless image is to be printed, the control unit suspends execution of the first control until the determination unit determines the image.

2. The apparatus according to claim 1, wherein in a case in which the image being shorter than the predetermined length is to be printed, the control unit is able to execute a second control of providing the margin portion on the front side of the image and cutting the image, and
in the case in which the marginless image is to be printed and in a case in which the determination unit has determined that the image is shorter than the predetermined length, the control unit executes not the first control but the second control.

3. The apparatus according to claim 2, wherein in the second control, the margin portion provided on the image is further provided on a tail side of the image.

4. The apparatus according to claim 1, wherein in the case in which the marginless image is to be printed, the printing unit forms an image without a margin at an edge of the continuous sheet in a direction crossing the conveyance direction of the continuous sheet.

5. The apparatus according to claim 1, wherein the predetermined length is one of a length with which the cutting unit is able to cut the continuous sheet and a length from a cutting position of the cutting unit to an outer periphery of a housing of the printing apparatus.

6. The apparatus according to claim 1, wherein the predetermined length is a minimum image length stored in a storage unit of an external apparatus.

7. A control method of a printing apparatus including:
a conveying unit configured to convey a continuous sheet;
a printing unit configured to print an image on the continuous sheet;
a cutting unit configured to cut the continuous sheet at a location of a leading edge side and a trailing edge side of the image printed on the continuous sheet;
a control unit configured to, in a case in which a marginless image is to be printed, execute a first control of providing a margin portion on a front side of the image and printing the image; and
a determination unit configured to determine whether the image is shorter than a predetermined length in a conveyance direction, the method comprising:
causing the control unit to prepare the first control; and
in the case in which the marginless image is to be printed, suspending execution of the first control until the determination unit determines the image.

8. The method according to claim 7, wherein in a case in which the image being shorter than the predetermined length is to be printed, the control unit is able to execute a second control of providing the margin portion on the front side of the image and cutting the image, and
the method further comprises, in the case in which the marginless image is to be printed and in a case in which the determination unit has determined that the image is shorter than the predetermined length, causing the control unit to execute not the first control but the second control.

9. The method according to claim 8, wherein in the second control, the margin portion provided on the image is further provided on a tail side of the image.

10. The method according to claim 7, further comprising, in the case in which the marginless image is to be printed, causing the printing unit to form an image without a margin at an edge of the continuous sheet in a direction crossing the conveyance direction of the continuous sheet.

11. The method according to claim 7, wherein the predetermined length is one of a length with which the cutting unit is able to cut the continuous sheet and a length from a cutting position of the cutting unit to an outer periphery of a housing of the printing apparatus.

12. The method according to claim 7, wherein the predetermined length is a minimum image length stored in a storage unit of an external apparatus.

13. A non-transitory storage medium storing a program for causing a computer of a control method of a printing apparatus including: a conveying unit configured to convey a continuous sheet; a printing unit configured to print an image on the continuous sheet; a cutting unit configured to cut the continuous sheet at a location of a leading edge side and a trailing edge side of the image printed on the continuous sheet; a control unit configured to, in a case in which a marginless image is to be printed, execute a first control of providing a margin portion on a front side of the image and printing the image; and a determination unit configured to determine whether the image is shorter than a predetermined length in a conveyance direction, the program comprising:
causing the control unit to prepare the first control; and
in the case in which the marginless image is to be printed, suspending execution of the first control until the determination unit determines the image.

* * * * *